(12) United States Patent
Karlsson et al.

(10) Patent No.: US 7,827,361 B1
(45) Date of Patent: Nov. 2, 2010

(54) METHOD OF CONTROLLING ACCESS TO COMPUTING RESOURCE WITHIN SHARED COMPUTING ENVIRONMENT

(75) Inventors: Magnus Karlsson, Mountain View, CA (US); Christos Karamanolis, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1777 days.

(21) Appl. No.: 10/970,888

(22) Filed: Oct. 21, 2004

(51) Int. Cl.
*G06F 12/00* (2006.01)
*G06F 9/46* (2006.01)
*G06F 15/167* (2006.01)

(52) U.S. Cl. .................. 711/147; 709/212; 718/105; 711/E12.038

(58) Field of Classification Search .................. 711/147; 709/212, 221, 226, 229, 250; 718/105
See application file for complete search history.

(56) References Cited

U.S. PATENT DOCUMENTS

2004/0010585 A1* 1/2004 Jones et al. .................. 709/224

OTHER PUBLICATIONS

Tarek F. Abdelzaher et al., Performance Guarantees for Web Server End-Systems: A Control-Theoretical Approach, 2002. <http://www.hpl.hp.com/personal/Nina_Bhatti/papers/tpds01.pdf>.
Tarek F. Abdelzaher et al., User-Level QoS-Adaptive Resource Management in Server End-Systems, May 2003. <http://www.cs.virginia.edu/~zaher/server-qos.ps>.
Tarek F. Abdelzaher et al., Web content adaptation to improve server overload behavior, The 8th International World Wide Web Conference, Toronto, Canada, May 1999. <http://www8.org/w8-papers/4c-server/web/web.pdf>.
Eric Anderson et al., Hippodrome: running circles around stage administration, Conference on File and Storage Technologies, pp. 175-188, USENIX, Berkeley, CA, 2002.
Karl J. Åström et al., Adaptive Control, 2nd Edition, Addison-Wesley Publishing Company, Reading, MS, 1995.
David D. Chambliss et al., Performance Virtualization for Large-Scale Storage Systems. 22nd International Symposium on Reliable Distributed Systems, pp. 109-118, IEEE, Los Alamitos, CA, Oct. 6, 2003.
Yixin Diao et al., Managing Web server performance with AutoTune agents. IBM Systems Journal, 42(1):136-149, IBM Corporation, White Plains, NY, 2003.

(Continued)

*Primary Examiner*—Reginald G Bragdon
*Assistant Examiner*—Aracelis Ruiz

(57) ABSTRACT

An embodiment of a method of controlling access to a computing resource within a shared computing environment begins with a first step of determining a plurality of controller functions for a plurality of operating ranges for workloads accessing the computing resource. Each of the controller functions comprises a mathematical operator which takes an input and provides an output. The method continues by iteratively performing second through fifth steps. In the second step, the method measures performance parameters for the workloads to determine a performance parameter vector for the workloads. In the third step, the method compares the performance parameter vector to a reference performance parameter vector to determine an error parameter. In the fourth step, the method applies a particular controller function selected from the plurality of controller functions to the error parameter to determine a target throughput for each of the workloads. In the fourth step, the method adjusts access to the computing resource for each of the workloads having a throughput limit different from about the target throughput for the workload by reducing or increasing the throughput limit for the workload to about the target throughput.

20 Claims, 12 Drawing Sheets

OTHER PUBLICATIONS

Yixin Diao et al., MIMO Control of an Apache Web Server: Modeling and Controller Design, 2002. <http://www.research.ibm.com/PM/acc02final2.pdf>.

Yixin Diao et al., On-line Response Time Optimization of Apache Web Server, Jun. 2003. <http://www.research.ibm.com/PM/iwqos03.ps>.

Yixin Diao et al., Optimizing Quality of Service Using Fuzzy Control, 2002. <http://www.research.ibm.com/PM/dsom2002.ps>.

Pawan Goyal et al., CacheCOW: QoS for Storage System Caches; Jun. 2003. <http://www.almaden.ibm.com/cs/people/dmodha/iwqos.pdf>.

Magnus Karlsson et al., Triage: Performance Guarantees for Shared Storage Access. Oct. 21, 2003. <http://www.hpl.hp.com/personal/Magnus_Karlsson/papers/sosp_wip.ppt>.

Magnus Karlsson et al., Triage: Performance Isolation and Differentiation for Storage Systems, HPL-2004-40, Hewlett-Packard, Palo Alto, CA, Apr. 12, 2004 <http://www.hpl.hp.com/techreports/2004/HPL-2004-40.html>.

Han Deok Lee, et al., Regulating I/O Performance of Shared Storage with a Control Theoretical Approach, Apr. 13, 2004. <http://romulus.gsfc.nasa.gov/msst/conf2004/Papers/MSST2004-12-Lee-a.pdf>.

Baochun Li et al., A Control Theoretical Model for Quality of Service Adaptations, 1998. <http://www.eecg.toronto.edu/~bli/papers/iwqos98.pdf>.

Xue Liu et al., On-line Response Time Optimization of Apache Web Server, Jun. 2003. <http://www.research.ibm.com/PM/iwqos03.ps>.

Chengyang Lu et al., A feedback control approach for guaranteeing relative delays in web servers, IEEE Real Time Technology and Applications Symposium, Taipei, Taiwan, 2001.

Ying Lu et al., An Adaptive Control Framework for QoS Guarantees and its Application to Differentiated Caching Services, 2002. <http://www.cs.virginia.edu/~zaher/ying02.ps>.

Chengyang Lu et al., Aqueduct: online data migration with performance guarantees, Proceeding of the 2nd USENIX Conference on File and Storage Technologies, pp. 219-230, USENIX, Berkeley, CA, 2002.

Ying Lu et al., Differentiated Caching Services; A Control-Theoretical Approach, 2001. <http://www.cs.virginia.edu/~zaher/icdcs01.ps>.

Christopher R. Lumb et al., Facade: Virtual storage devices with performance guarantees, Proceeding of the 2nd USENIX Conference on File and Storage Technologies, pp. 131-144, USENIX Association, Berkeley, CA, Mar. 2003.

Sujay Parekh et al., Using Control Theory to Achieve Service Level Objectives In Performance Management, 2000. <http://www.research.ibm.com/PM/im2001gac.pdf>.

Anders Robertsson et al., Analysis and design of admission control in web-server systems, Jun. 2003. <http://www.telecom.lth.se/panda/research/publications/kihl_acc2003.pdf>.

Vijay Sundaram et al ., A Practical Learning-Based Approach for Dynamic Storage Bandwidth Allocation, Eleventh International Workshop on Quality of Service, Monterey CA, pp. 479-497, Springer-Verlag, Berlin, Germany, Jun. 2003.

Matt Welsh et al., Adaptive Overload Control for Busy Internet Servers, 4th USENIX Symposium on Internet Technologies and Systems, USENIX Association, Berkeley, CA, Mar. 26, 2003.

Christos Karamanolis et al., U.S. Appl. No. 10/970,887, filed Oct. 21, 2004.

Magnus Karlsson et al., U.S. Appl. No. 10/970,888, filed Oct. 21, 2004.

* cited by examiner

400

```
1    if < 6 requests
2    exit
3    estimate new model parameters
4    current model = new model + λ * old model
5    if new model very different form old model
6        discard old model
7        u(k) = u_max
8        exit
9    if sign of current model negative or r_1 = 0
10       current model = old model
11   set u*(k) according to current model
12   if u*(k) < 0
13       u(k) = 0
14   else if u*(k) > u_max
15       u(k) = u_max
16   else
17       u(k) = u*(k)
18   old model = current model
```

US 7,827,361 B1

METHOD OF CONTROLLING ACCESS TO COMPUTING RESOURCE WITHIN SHARED COMPUTING ENVIRONMENT

RELATED APPLICATIONS

This application is related to U.S. application Ser. Nos. 10/970,887 filed Oct. 21, 2004, and 10/972,232 (U.S. Patent Publication No. 2006/0090165), filed Oct. 21, 2004, the contents of which are hereby incorporated by reference.

FIELD OF THE INVENTION

The present invention relates to the field of computing. More particularly, the present invention relates to the field of computing where access to a computing resource is controlled.

BACKGROUND OF THE INVENTION

Ensuring performance isolation and differentiation among workloads is a basic requirement in all computational environments where physical resources are shared among multiple "customers". This is typical in emerging consolidated data centers, such as those implemented by HP's Utility Data Center. For example, this is a problem for storage sharing, since storage access contributes substantially to the overall performance perceived by the applications running in consolidated data centers. The same problem applies to resources other than storage (including CPUs or fractions of them, memory, network bandwidth, and other computing resources).

It is important to ensure that customers of consolidated data centers receive the resources and performance (e.g., service level objectives) they are entitled to. More specifically, the performance of workloads must be isolated from the activities of other workloads that share the same infrastructure. Further, available resources should be shared among workloads according to their relative importance. Ensuring that customers get the resources they pay for (and do so in a provable way) is a potential value-added service that HP products such as the UDC could offer to differentiate them from the competition.

Existing state-of-the-art management tools rely on automatic provisioning of adequate resources to achieve certain performance goals. Although resource provisioning is necessary to meet the basic performance goals of workloads, it is not intended to handle rapid workload fluctuations and system changes and short-term peak demands. Further, it may be prohibitively expensive to provision for a worst case scenario. In fact, it may be impossible to provision for a worst-case scenario since the worst-case scenario is typically not known in advance of its occurrence. Many of these issues may be addressed by controlling access to a computing resource.

Therefore, what is needed is a method of controlling access to a computing resource. It is toward this end that the present invention is addressed.

SUMMARY OF THE INVENTION

The present invention comprises a method of controlling access to a computing resource within a shared computing environment. According to an embodiment, the method begins with a first step of determining a plurality of controller functions for a plurality of operating ranges for workloads accessing the computing resource. Each of the controller functions comprises a mathematical operator which takes an input and provides an output. The method continues by iteratively performing second through fifth steps. In the second step, the method measures performance parameters for the workloads to determine a performance parameter vector for the workloads. In the third step, the method compares the performance parameter vector to a reference performance parameter vector to determine an error parameter. In the fourth step, the method applies a particular controller function selected from the plurality of controller functions to the error parameter to determine a target throughput for each of the workloads. In the fourth step, the method adjusts access to the computing resource for each of the workloads having a throughput limit different from about the target throughput for the workload by reducing or increasing the throughput limit for the workload to about the target throughput.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

According to an aspect, the present invention comprises a method of adaptively controlling access to a computing resource within a shared computing environment. According to another aspect, the present invention comprises a method of non-adaptively controlling access to a computing resource within a shared computing environment using a plurality of controller functions determined in an identification and validation process. According to another aspect, the present invention comprises a method of distributively controlling access to storage within a shared computing environment. Tasks according to some embodiments can be performed by a computer. Computer readable media (such as memory or disk-based storage devices) can comprise computer code for implementing tasks according to some embodiments.

Preferably, the methods of adaptively and non-adaptively controlling access to the computing resource control access to storage. Alternatively, the methods of adaptively and non-adaptively controlling access to the computing resource control access to another computing resource such as processing unit cycles, processing units, memory, network bandwidth, servers, another computing resource, or a combination thereof. For example, a plurality of virtual machines may share one or more processors and the methods of adaptively and non-adaptively controlling access to the computing resource may be used to allocate processing unit cycles to the virtual machines.

Figure 1:
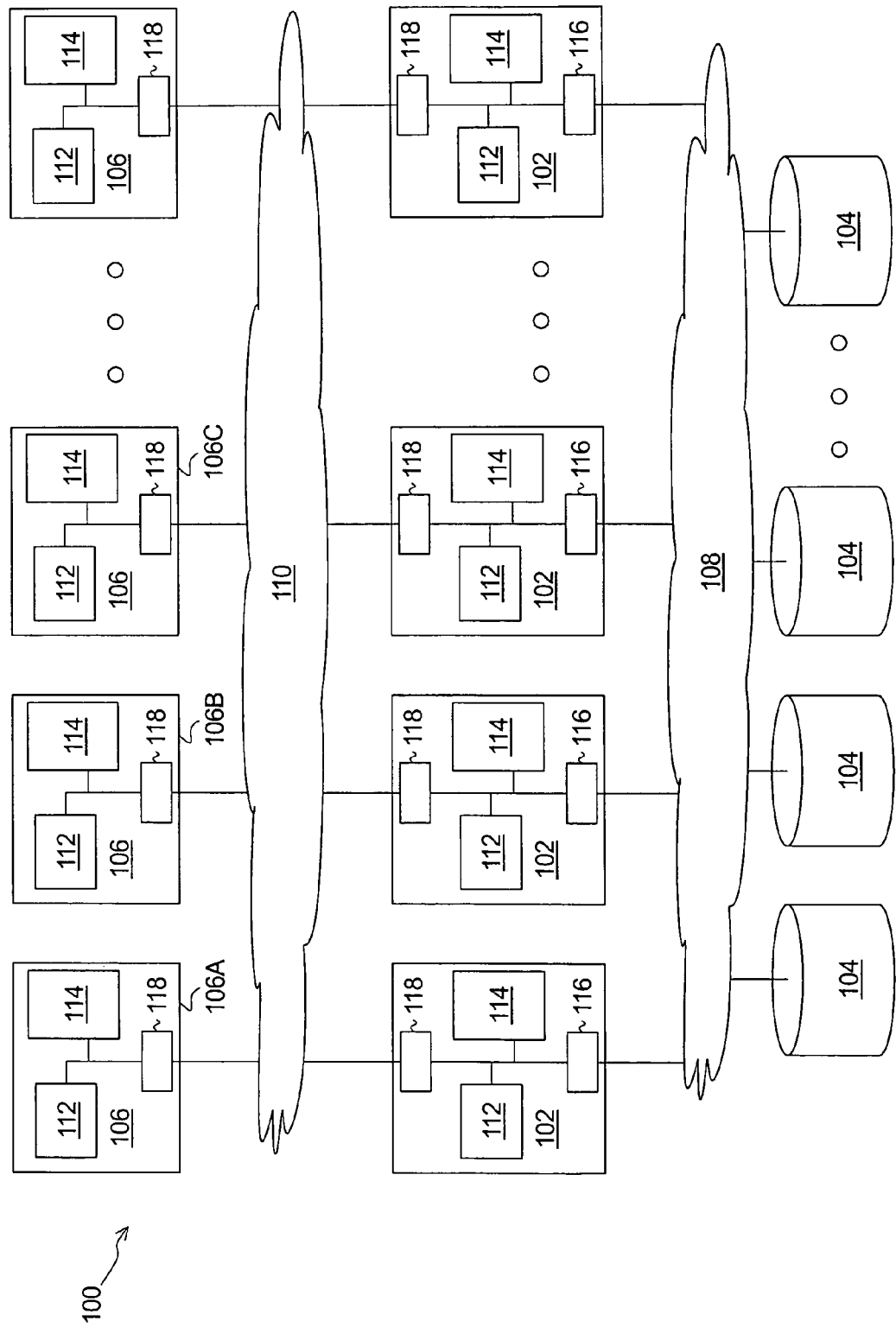
FIG. 1 schematically illustrates an embodiment of a shared computing environment upon which methods of adaptively and non-adaptively controlling access to storage resources of the present invention are applied.

FIG. 1 schematically illustrates an embodiment of a shared computing environment 100 upon which the methods of adaptively and non-adaptively controlling access to storage are applied. The shared computing environment 100 comprises storage servers 102, disk arrays 104, clients 106, a SAN (storage area network) 108, and a network 110. The SAN 108 couples the storage servers 102 to the disk arrays 104. Alternatively, multiple SANs couple groups of storage servers 102 to groups of disk arrays 104.

The network 110 couples the clients 106 to the storage servers 102. The network 110 may be a LAN (local area network), a WAN (wide area network), a combination of a LAN and a WAN, or some other network. Each storage server 102 comprises a processor 112, memory 114, SAN interface 116 (e.g., a host bus adapter), and a network interface 118 (e.g., a network interface card). Each client 106 comprises a processor 112, memory 114, and a network interface 118. One or more clients 106 may act as a server for a secondary set of clients. For example, a client 106 may act as a gateway to the storage servers 102 for a group of secondary clients on a LAN.

The clients 106 access the disk arrays 104 (i.e., storage resources) through I/O (input/output) operations. The I/O operations may have units of I/O operations per unit time (e.g., for transactions of similar size) or units of data per unit time (e.g., for transactions of various sizes). Desired I/O operations are referred to as workloads. Actual I/O operations are referred to as throughputs. If the shared computing environment 100 is greatly over-provisioned, workloads and throughputs will mostly be synonymous. That is, even at times of peak demand, network and storage resource capabilities are able to fulfill workloads resulting in throughputs which are close to workloads. In contrast, if the shared computing environment is adequately provisioned, at times aggregate workload will exceed network and storage resource capabilities resulting in throughputs which are below workloads.

The terms workloads and throughputs also apply in situations where the methods of adaptively and non-adaptively control access to a computing resource other than storage. For example, if the clients are virtual machines and the computing resource is processing unit cycles, the workloads are the processing unit cycles which the virtual machines desire and the throughputs are the processing unit cycles which the virtual machines receive. A workload is a sequence (possibly unbounded) of operations (e.g., I/O operations) submitted to a computing system. Each operation is of finite execution time. Throughput is the rate of operations per unit time which are submitted or executed by the system A workload is executed with a throughput.

Figures 2, 4:
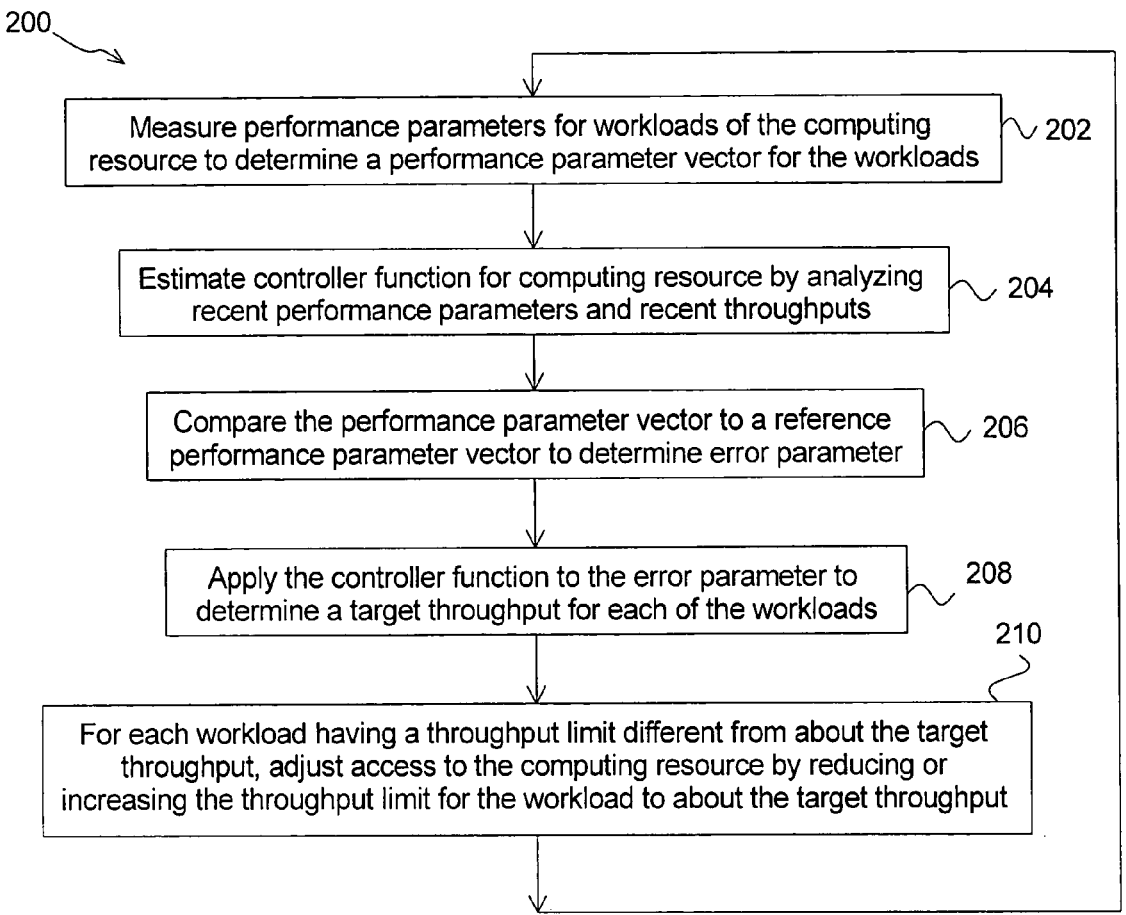
FIG. 2 illustrates an embodiment of a method of adaptively controlling access to a computing resource of the present invention as a flow chart.
FIG. 4 provides an embodiment of pseudo-code employed by a method of adaptively controlling access to a computing resource of the present invention.

An embodiment of a method of adaptively controlling access to a computing resource within a shared computing environment is illustrated as a flow chart in FIG. 2. The method 200 begins with a first step 202 of measuring performance parameters for workloads accessing the computing resource to determine a performance parameter vector. As used herein, the term "vector" is a mathematical construct of an ordered array of numbers. In an embodiment in which the computing resource is storage, the performance parameter vector comprises an array of access latencies for the workloads.

The method 200 continues with a second step 204 of estimating a controller function for the computing resource by analyzing recent performance parameters and recent throughputs. The controller function comprises a mathematical operator which takes an input and provides an output. In an embodiment in which the computing resource is storage, the performance parameters are access latencies (i.e., delays) for the I/O operations which access the storage. In an embodiment, the analysis of the recent performance parameters comprises a regression analysis. Preferably, the regression analysis comprises a linear least squares regression analysis. Alternatively, the regression analysis comprises another regression analysis such as a non-linear least squares regression analysis or a regression analysis other than a least squares regression analysis.

In a third step 206, the method 200 compares the performance parameter vector to a reference performance parameter vector to determine an error parameter. In a fourth step 208, the method 200 applies the controller function to the error parameter to determine a target throughput for each of the workloads.

An example helps to illustrate the second through fourth steps, 204 and 208. In the example, first, second, and third clients, 106A, 106B, and 106C, access disk arrays 104 via the storage servers 102 (FIG. 1) and have been assigned reference performance parameters (i.e., reference access latencies) of 8, 12, and 11 ms, respectively. The reference performance parameters comprise the reference performance parameter vector. Previously, an aggregate throughput had been set at 1,000 I/O operations per second with each of the first, second, and third clients, 106A, 106B, and 106C, receiving a one third share. Alternatively, shares of the aggregate throughput may be assigned according to throughput allocation table which assigns shares of throughputs according to a specification of bands. (The throughput allocation table is discussed in more detail below.) The aggregate throughput of 1,000 I/O operations per second may have been set in a previous iteration of the method 200 (FIG. 2). Alternatively, the aggregate throughput of 1,000 I/O operations per second may have been set as a default aggregate throughput.

In the second step 204, latencies of 9, 11, and 13 ms are measured for the first, second, and third clients, 106A, 106B, and 106C. The latencies of 9, 11, and 13 ms comprise the performance parameter vector (i.e., a latency vector) for the first, second, and third clients, 106A, 106B, and 106C. In the third step 206, the performance parameter vector (9, 11, and 13 ms) is compared to the reference performance parameter vector (8, 12, and 11 ms), which determines an error vector of (8−9, 12−11, 11−13) or (−1, 1, −2). A minimum value of the error vector (−2 ms for the third client 106C) is provided in the third step 206 as the error parameter. In the fourth step 208, the controller function is applied to the error parameter. According to an embodiment, the controller function is given by:

$$u(k)=\gamma(y_{ref}-y(k-1))+\delta(k-1)=\gamma e(k)+\delta(k-1)$$

where u(k) is the target throughput, $\gamma$ and $\delta$ are positive constants determined in the first step 202, $y_{ref}$ is a reference performance parameter, y(k−1) is a performance parameter, u(k−1) is a current target throughput, and e(k) is the error parameter. The target throughput u(k) is an operating point. The current target throughput u(k−1) is the operating point from a previous iteration of the method or a default value such as the maximum throughput.

Figure 3:
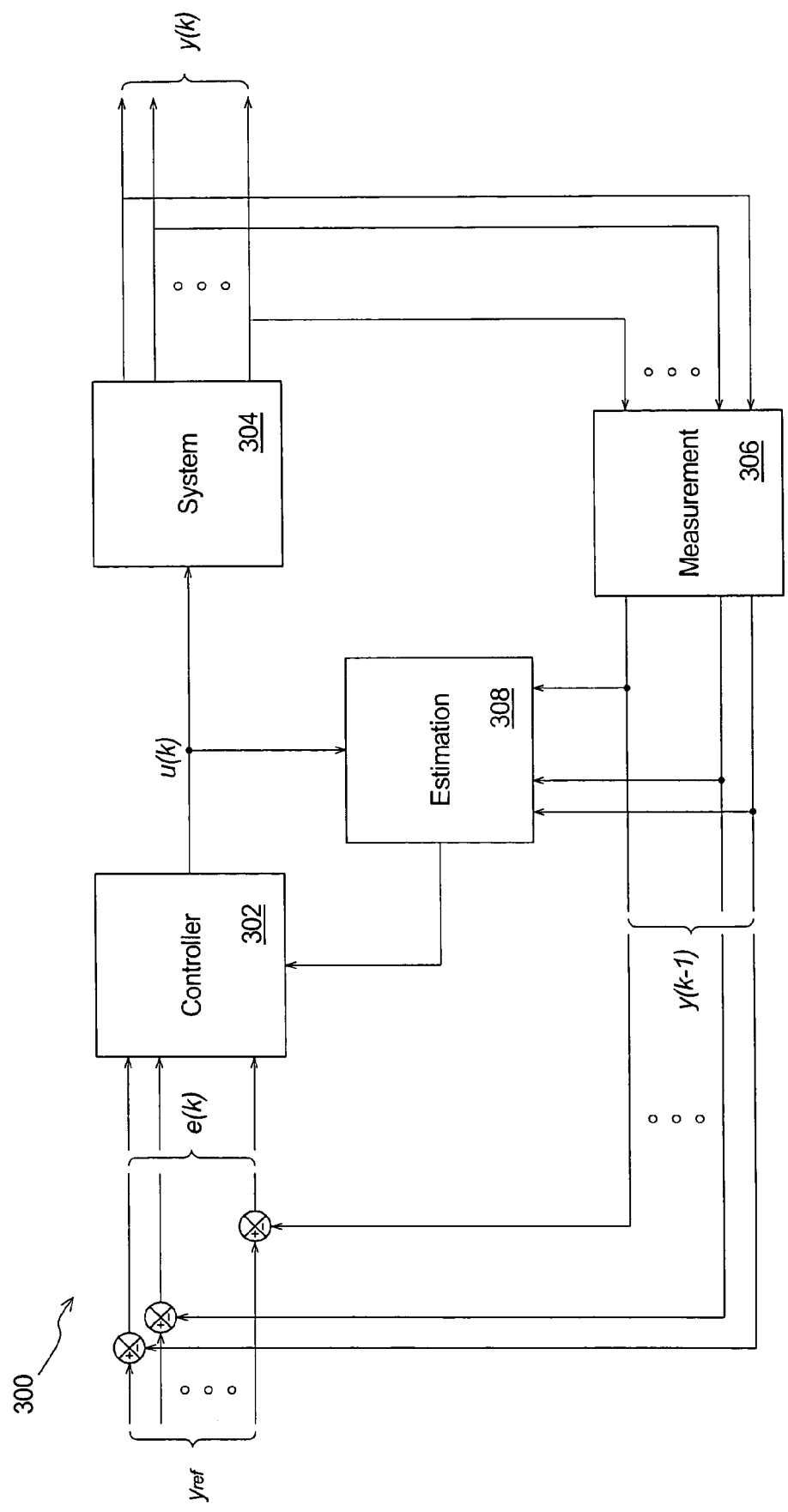
FIG. 3 illustrates an embodiment of feedback loop employed by a method of adaptively controlling access to a computing resource of the present invention as a block diagram.

Table 1 provided as FIG. 3 summarizes the workloads, the reference performance parameter vector, the latency vector (i.e., the performance parameter vector), and possible solutions for aggregate target throughput.

TABLE 1

| Clients | Ref. perf. par. vector (ms) | Latency vector (ms) | Poss. solutions for aggr. target throughput u(k) |
|---|---|---|---|
| Client 106A | 8 | 9 | $\gamma * (-1) + \delta * 1{,}000$ |
| Client 106B | 12 | 11 | $\gamma * 1 + \delta * 1{,}000$ |
| Client 106C | 11 | 13 | $\gamma * (-2) + \delta * 1{,}000$ |

In the third and fourth steps 206 and 208, the possible solution for aggregate target throughput having the lowest value is chosen as the solution for aggregate target throughput since this is the solution which is most likely to result in all workloads meeting their respective reference performance parameter. The third client 106C provides the lowest value for aggregate target throughput because the third client 106C has the minimum error parameter of −2 ms. This leads to assigning each of the first, second, and third clients, 106A, 106B, and 106C, a one third share of the aggregate target throughput for the third client 106C, which is given by one third of $\gamma*(-2)+\delta*1{,}000$.

An iteration of the method 200 concludes with a fifth step 210 of adjusting access to the computing resource for each workload having a throughput limit different from the target throughput for the workload by reducing or increasing the throughput limit for the workload to the target throughput. In the above example, the fourth step 208 reduces the throughput for the workloads for the first, second, and third clients, 106A, 106B, and 106C, to about the target throughput of one third of $\gamma*(-2)+\delta*1{,}000$. The throughput limit for a workload is enforced somewhere on the data path for the workload by buffering excess throughput and releasing it as the throughput limit allows. In an embodiment which controls access to storage one of the servers may perform the method 200 or multiple servers may coordinate to perform the method or a coordinator (e.g., a separate computer or a client) may perform the method 200.

In an embodiment, the method 200 is performed iteratively over time to control access to the computing resource over time.

The method 200 provides several benefits including performance isolation and performance differentiation. The method 200 provides performance isolation by ensuring that a workload receives sufficient resources for the performance which it is entitled to, irrespective of other workloads in the system. The method 200 provides performance differentiation by differentiating among workloads by assigning shares to workloads (e.g., each workload having a particular share) or by specification of shares by bands (discussed in more detail below).

The method 200 employs a feedback loop for controlling access to the computing resource. In an embodiment, the method 200 employs a feedback loop for controlling access to storage within an enterprise storage system. An enterprise storage system typically comprises a number of storage servers and a number of clients (i.e., client nodes) that access data from the storage servers. One or more workloads may originate from a client. To keep the discussion simple, here it is assumed that there is a 1:1 mapping between clients and workloads. Examples of enterprise storage systems include network file systems (e.g., NFS), cluster file systems (e.g., Frangipani, Lustre), or block-based storage (e.g., FAB—Federated Array of Bricks). Here, an installation of a cluster file system (Lustre) with 8 clients and 1 or 2 servers is referred to for exemplary purposes.

In an embodiment, there are two types of performance goals for each of the workloads that share a storage infrastructure: The first performance goal is a latency target for a workload which should be met for all requests of the workload. The latency target depends mostly on the characteristics of the corresponding application (e.g., timeouts, tolerance to delays). The second performance goal is a maximum throughput allotment for a workload. The maximum throughput allotment is the maximum throughput for which a customer has contracted.

Both the latency target and the maximum throughput allotment are soft goals. Further, customers do not assign the same importance to the entire range of throughput required for their workloads. For example, the first few tens of IO/s are very important for most applications to make some progress. Above that, the value customers assign to the required throughput typically declines, but with different rates for various workloads.

To capture such varying cost functions for throughput, the available aggregate system bandwidth is divided into a number of bands (e.g., 0-100 IO/s, 100-300 IO/s). For each such band, we specify what percentage of the band's throughput should be allocated to each workload up to the maximum allotment for the workload.

At each instance, a system is at some operating point. That is, X % in band Y. The operating point quantifies how much throttling (i.e., adjustment) is performed on the workloads (i.e., the throughput limit for each workload). As long as the latency targets are met, the operating point is shifted higher. As soon as at least one latency target is missed, the workloads are throttled increasingly more aggressively according to the specifications of the bands. In other words, the operating point is shifted lower, until all latency goals are again met. Throttling enforces a maximum allowable throughput (i.e., a throughput limit) for a workload.

The feedback controller arbitrates system throughput by throttling client requests according to the workload performance specifications. (Note that the allocation of throughput for workloads according to the bands is discussed in more detail below relative to Table 2.) No additional instrumentation is added to the system to either perform throttling or to obtain measurements. The feedback loop depends merely on externally observed metrics of the system's performance (i.e., response latency and throughput).

An embodiment of the feedback loop is illustrated as a block diagram in FIG. 3. The feedback look 300 comprises a controller block 302, a system block 304, a measurement block 306, and an estimation block 308. The controller block 302 provides an operating point u(k) which is the aggregate target throughput. The system block 304 allocates the aggregate target throughput to the workloads according to the specification of the bands which results in measured latencies y(k) for the workloads. The measured latencies are average latencies observed over a sampling period. The measurement block 306 forwards the previous cycle's measured latencies y(k−1) to the estimation block 308 and to the controller block 302. The estimation block 308 retains a number of recent cycles of measured latencies as well as recent operating points which are used in a least squares regression analysis to estimate a controller function which is forwarded to the controller block 302. The target latencies $y_{ref}$ are also provided to the controller block 302. The controller block 302 applies the controller function to the lowest latency error value e(k), which is the lowest value of the target latencies $y_{ref}$ minus the respective values of the previous cycle's measured latencies y(k−1). Based on the lowest latency error value e(k), the controller block 302 determines the operating point u(k) which is the maximum aggregate throughput allowed for the system. In an embodiment, throttling modules for each of the workloads adjust the workloads' throughputs accordingly. Each throttling module intercept requests somewhere on the data path for its workload, buffers requests that exceed the allowed throughput, and releases buffered requests as the allowed throughput dictates. The throttling module for a workload may be located at the client or somewhere on the network between the client and the storage server.

The estimation block 308 of the feedback loop 300 dynamically estimates a model of the system and adapts the controller block 302 as the operating range of the system changes. The estimation block 308 uses an on-line least-squares regression analysis of a number of recent cycles of measured latencies and operating points. For example, the on-line least-squares regression analysis may use the last ten cycles of measured latencies and operating points in which older measured latencies and operating points are weighted less than newer measured latencies. Preferably, the model is estimated at every sampling period. Alternatively, the model is estimated at less than every sampling period. The feedback loop 300 including the estimation block 308 is referred to in control theory as an adaptive controller and in particular as a direct self-tuning regulator. The feedback loop 300 provides stability (i.e., stable operation), fast settling times, and low overshoot. A direct self tuning regulator estimate control loop parameters (including the controller parameters) in a single step, resulting in better response to changes in the system as well as simpler mathematical formulations.

The system may be captured by a first-order model and a simple I-controller (integral-controller) works well for a small operating range that is fully understood. Thus, an I-controller is used for the adaptive controller. The adaptive controller uses a model for the closed-loop system that is of the following form:

$$y(k)=s_1 y(k-1)+r_1 u(k)+r_2 u(k-1) \quad (1)$$

where $s_1$, $r_1$, and $r_2$ are model constants.

The direct self-tuning regulator estimates a closed-loop model that directly captures the controller parameters. A controller is basically a function that returns a value for the operating point u(k). Solving equation (1) for the operating point u(k) gives:

$$u(k) = \frac{1}{r_1} y(k) - \frac{s_1}{r_1} y(k-1) - \frac{r_2}{r_1} u(k-1) \quad (2)$$

If equation (2) is used to calculate the operating point u(k) for interval k, then y(k) represents the desirable latency for interval k, which is $y_{ref}$. Thus, the control law is given by:

$$u(k) = \frac{t_0}{r_1} y_{ref} - \frac{s_1}{r_1} y(k-1) - \frac{r_2}{r_1} u(k-1) \quad (3)$$

where $t_0$ is a constant that governs how aggressively the controller responds to system changes. From control theory, it is known that it is mostly the denominator of the Z-transform of the closed-loop transfer function that governs the behavior of the system. The closed-loop transfer function has two controllable poles. The two controllable poles correspond to a second-order polynomial factor in the denominator that is of the form:

$$z^2 + a_1 z + a_2 \quad (4)$$

where z is a variable in z-space (a frequency domain), and $a_1$ and $a_2$ are constants of the denominator.

By solving equation (3) for $t_0$ with the transfer function set to the inverse of equation (4), the following expression for $t_0$ is obtained:

$$t_0 = 1 + a_1 + a_2 \quad (5)$$

It can be shown that equation (3) is a transfer function of an I-controller by rewriting it in the following form:

$$u(k)=\gamma(y_{ref}-y(k-1))+\delta u(k-1)=\gamma e(k)+\delta u(k-1) \quad (6)$$

System analysis aims at designing a closed-loop system with desired properties by setting γ and δ appropriately.

The stability of the proposed adaptive controller can be established using a variation of a well-known proof. The proof applies to a simple direct adaptive control law that uses a gradient estimator. Here, however, the adaptive controller uses a least-squares estimator. The proof is adapted to apply to the least squares estimator by ensuring persistent excitation so that the estimated covariance matrix stays bounded. The rest of the proof steps remain the same. For the proof to be applicable, the closed-loop system must satisfy all the following properties: (i) the delay d (number of intervals) by which previous outputs y(k) affect the closed-loop transfer function; (ii) the zeroes (roots of the nominator) of the system's transfer function are within the unit circle; (iii) the sign of $r_1$ is known; and (iv) the upper bound on the order of the system is known. For our system, d=1, the zeroes of the system are at zero, $r_1 > 0$, and it is known from experimentation that the system here can be described well by a first-order model. Given that these conditions hold, the proof shows that the following are true: (a) the estimated model parameters are bounded; (b) the normalized model prediction error converges to zero; (c) the actuator setting u(k) and system output y(k) are bounded; and (d) the controlled system output y(k) converges to the reference value $y_{ref}$.

Therefore, the closed-loop system with the direct self-tuning regulator is stable and the system latency converges to the reference latency in steady state.

In addition to stability, values for γ and δ should be chosen so that the closed loop experiences low settling times and low overshoot. δ is a function of $r_1$ and $r_2$, both of which are estimated by means of the on-line least-squares regression process for fitting model equation (1). $\gamma$ is a function of $s_1$, $r_1$ and $t_0$. The former two are also estimated by model fitting. Thus, finding the right value for $t_0$ will achieve the desired pole setting.

It is well-known from control-theory, that in order to eliminate oscillations, the poles of the closed loop transfer function must be within the unit circle. Also, to avoid any overshoot, the poles must have a real number part larger than equal to 0. Finally, settling times are in general lower as the poles approach 0. Thus, the fastest settling system without any overshoot is generally one with pole values of 0. From equations (4) and (5), this leads to $t_0=1$.

A number of heuristics may be employed to improve the properties of the closed loop based on knowledge of the specific domain. An embodiment of an algorithm for operation of the control loop including some heuristics for improving the properties of the closed loop is provided in FIG. 4 as psuedo-code. The algorithm 400 is employed by the estimation block 308 as it performs the on-line controller design process.

First, in line 1, the algorithm 400 applies a conditional update law. It checks whether there are enough requests in the last sample interval for it to be statistically significant. According to an embodiment, at least 6 requests are required. According to other embodiments, some other minimum number of requests are required. Otherwise, neither the model parameters are modified nor the actuation is changed. To avoid potential system deadlock when all controllers decide not to do any changes (e.g., the system becomes suddenly extremely loaded and slow because of a component failure), one random controller in the system does not execute this if-statement. This ensures that one control loop is always executed and affects the system.

At every sample period, the algorithm performs an on-line estimation of the model of the closed-loop system (equation (1)), as described earlier. That is, it estimates parameters $s_1$, $r_1$, and $r_2$ using least-squares regression on the measured latencies for a number of recent cycles. As a model derived from just one sample interval is generally not a good one, the algorithm uses a model that is a combination of the previous model and the model calculated from the last interval measurements. The extent that the old model is taken into account is governed by a forgetting factor $\lambda$, where $0<\lambda\leq 1$.

When the system changes suddenly, the controller needs to adapt faster than what the forgetting factor $\lambda$ allows. This case is handled by the reset law of line 5. If any of the new model parameters differ more than 30% from those of the old model, the old model is not taken into account at all. To ensure sufficient excitation so that a good new model can be estimated for the system, the operating point $u(k)$ is set to its maximum value $u_{max}$. In the down side, this results in poor workload isolation and differentiation for a few sample intervals. However, it pays off, as high excitation means a better model and thus the loop settles faster.

There is a possibility that the estimated model predicts a behavior that we know to be impossible in the system. Specifically, it may predict that an increase in throughput results in lower latency or that $r_1=0$. This is tested in line 9. As this can never be the case in computer systems, the algorithm discards the new model and uses the one of the previous interval instead. Even if such a wrong model was allowed to be used, the controller would eventually converge to the right model. By including this, the controller converges faster.

Finally, the new operating point $u(k)$ is calculated in line 11 using equation (6) with the current model estimates. However, the operating point $u(k)$ is checked to make sure that the controller does not set $u(k)$ to an impossible value, either $u(k)<0$ or $u(k)>u_{max}$, using an anti-windup law in line 12. In those cases, the value of $u(k)$ is set to 0 or $u_{max}$, respectively. Not having this anti-windup safeguard might make the controller unstable if it spent several sample periods with values below 0 or above $u_{max}$. An iteration of the algorithm completes with updating the old model with the new one in line 18.

Figure 5:
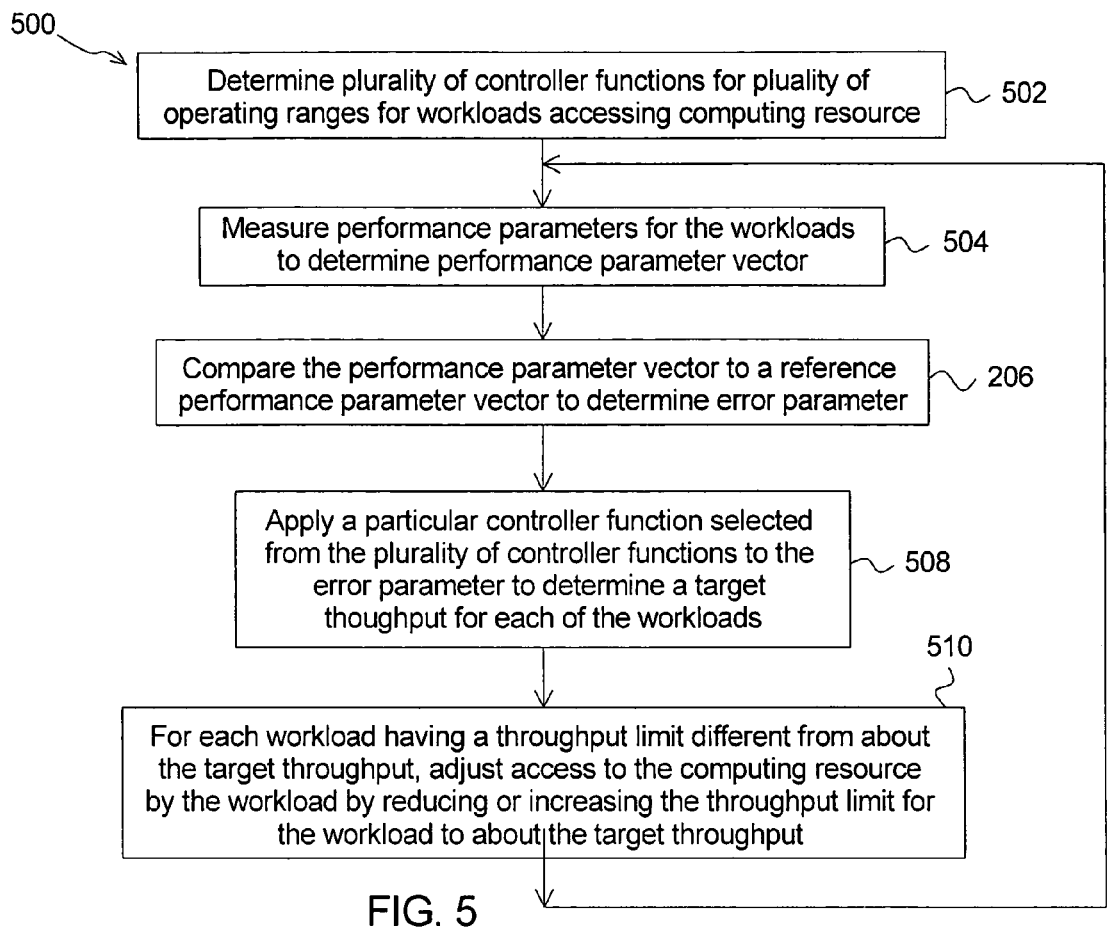
FIG. 5 illustrates an embodiment of a method of controlling access to a computing resource of the present invention as a flow chart.

An embodiment of a method of controlling access to computing resource of shared computing environment of the present invention is illustrated as a flow chart in FIG. 5. The method 500 begins with a first step 502 of determining a plurality of controller functions for a plurality of operating ranges for workloads accessing the computing resource. The operating ranges comprise an overall operating range for the computing resource. Preferably, the first step 502 divides the overall operating range into the operating range such that each of the operating ranges may be modeled linearly. This leads to a plurality of piece-wise linear controller functions which model the overall operating range. Alternatively, the overall operating range may be divided into operating ranges that may be modeled using non-linear functions. In an embodiment, the first step 502 excites a system using white noise in order to characterize the overall operating range and measure system response data. The controller functions are then modeled using regression analysis of the system response data. Preferably, the regression analysis is a least squares regression analysis. For example, if the computing resource is storage, each client excites the system with white noise I/O to determine I/O throughput and latency data, which is used in regression analysis to determine controller functions for controlling access to the storage.

The method 500 continues by iteratively performing second through fifth steps, 504 through 510. The second step 504 measures performance parameters for workloads accessing the computing resource to determine a performance parameter vector for the workloads. In an embodiment in which the computing resource is storage, the performance parameters comprise latencies. The third step 506 compares the performance parameter vector to a reference performance parameter vector to determine an error parameter. In an embodiment, the error parameter is determined by subtracting the performance parameter vector from the reference performance parameter vector to determine an error vector and selecting a minimum value term of the error vector as the error parameter.

The fourth step 508 applies a particular controller function selected from the plurality of controller functions to the error parameter to determine a target throughput for each of the workloads. In an embodiment, the third and fourth steps, 506 and 508, comprise determining a lowest value for a latency error and applying the particular controller function selected from the plurality of controller functions to the lowest value for the latency error to determine an aggregate throughput. The aggregate throughput is divided into target throughputs for the workloads according to shares or specification of shares by bands.

The fifth step 508 adjusts access to the computing resource for each workload having a throughput limit different from the target throughput by reducing or increasing the throughput limit for the workload to about the target throughput.

In alternate embodiments, the methods 200 and 500 provide provisioning. In these embodiment, the operating point $u(k)$ would control a provisioning process (e.g., how many servers a workload would get, or how much storage capacity a workload would be assigned). In other alternate embodiments, the method 200 and 500 apply to application level goals rather than system level goals. In these embodiments, the methods 200 and 500 would control access to a computing resource among applications which are part of a particular workload or which are spread among a number of workloads. In other alternate embodiments, the methods 200 and 500 provide performance isolation and differentiation for transactions. The transactions could be web-server transactions, database transactions, or some other set of transactions.

In an embodiment, the method 500 employs a feedback loop for controlling access to storage within an enterprise storage system. For the discussion here, a cluster file system is used as an example for the enterprise storage system. The discussion here also applies to other enterprise storage systems (e.g., with block- or file-level access).

To enforce workload isolation and differentiation, resources should be shared among workloads on the basis of two criteria: 1) their relative importance; 2) the resources they already consume.

The details of how to specify workload throughput allotments can be best explained with an example. Table 2 presents an exemplary allocation of throughputs to two workloads using a specification of bands.

TABLE 2

| Description | Band 0 | Band 1 | Band 2 |
| --- | --- | --- | --- |
| Aggr. throughput IO/s | 0-100 | 101-300 | 301-500 |
| Workload W1 | 50% | 100% | 0% |
| Workload W2 | 50% | 0% | 100% |

The two workloads are a business critical workload W1 which demands up to 350 IO/s, irrespective of other workload activities and another workload W2 (e.g., one performing data mining) which requires up to 550 IO/s. The other workload W2 is less important than the business critical workload W1, but the other workload W2 requires at least 50 IO/s to make progress, otherwise the application fails. The business critical workload W1 will also fail if it does not get 50 IO/s. To satisfy the combined throughput requirements of the two workloads, we specify the three bands for throughput sharing, as shown in Table 2. According to the specification, the first 100 IO/s in the system are shared equally between the two workloads, so that both can make progress. Any additional available throughput up to a total of 400 IO/s is reserved for W1. Thus, W1's 350 IO/s are met first. Any additional available throughput is given to W2 until its 550 IO/s goal is met. Any further throughput in the system is shared equally between the two workloads.

In general, any number of bands can be defined for any number of workloads that may share the system, following the principles of this example. Of course, there must be at least one workload that has a non-zero allotment in each specified band. Also, the total allotments in each band should add up to 100%, for the specification to make sense.

If the system's capacity at some instance is sufficient to meet fully all throughput allotments up to band i, but not fully the allotments of band i+1, then we say that the "system is operating in band i+1". Any throughput above the sum of the throughputs of bands 0 . . . i is shared among the workloads according to the ratios specified in band i+1. The total available throughput indicates the operating point u(k) of the system. With 500 IO/s total system throughput in our example, the operating point u(k) of the system is 20% in band 2.

In addition, the latency target of each workload should be met in the system. At an instance in time, the system is operating in a band i. As soon as the latency goal of at least one workload with a non-zero throughput allotment in any band j, $j \leq i$, is violated, the system must throttle the workloads back until no such violations are observed. Throttling within the specifications of band i may be sufficient, or the system may need to throttle more aggressively down to some band k, k<i. On the other hand, it is desirable to utilize the system's available throughput as much as possible. Therefore, when the system is operating in band i and the latency goals of all workloads with non-zero throughput allotments in bands 0.1 are met, the system can let more requests through. This may result in the system operating in a band m, m>i.

In the embodiment of the method 400 which employs a feedback loop for controlling access to storage within an enterprise storage system, the enterprise storage system comprises a number of storage servers and a number of clients (i.e., client nodes) that access data on the storage servers. One or more workloads may originate from a client. For the discussion here, it is assumed that there is a 1:1 mapping between clients and workloads. Examples of such enterprise storage systems include network file systems (e.g., NFS), cluster file systems (e.g., Frangipani, Lustre), or block-based storage (e.g., FAB). Here, an installation of a cluster file system (Lustre) with 8 clients and 1 or 2 servers is referred to for exemplary purposes.

The feedback loop arbitrates usage of system throughput by throttling client requests according to the workload performance specifications. The feedback loop depends merely on externally observed metrics of the system's performance (i.e., response latency and throughput).

Figure 6:
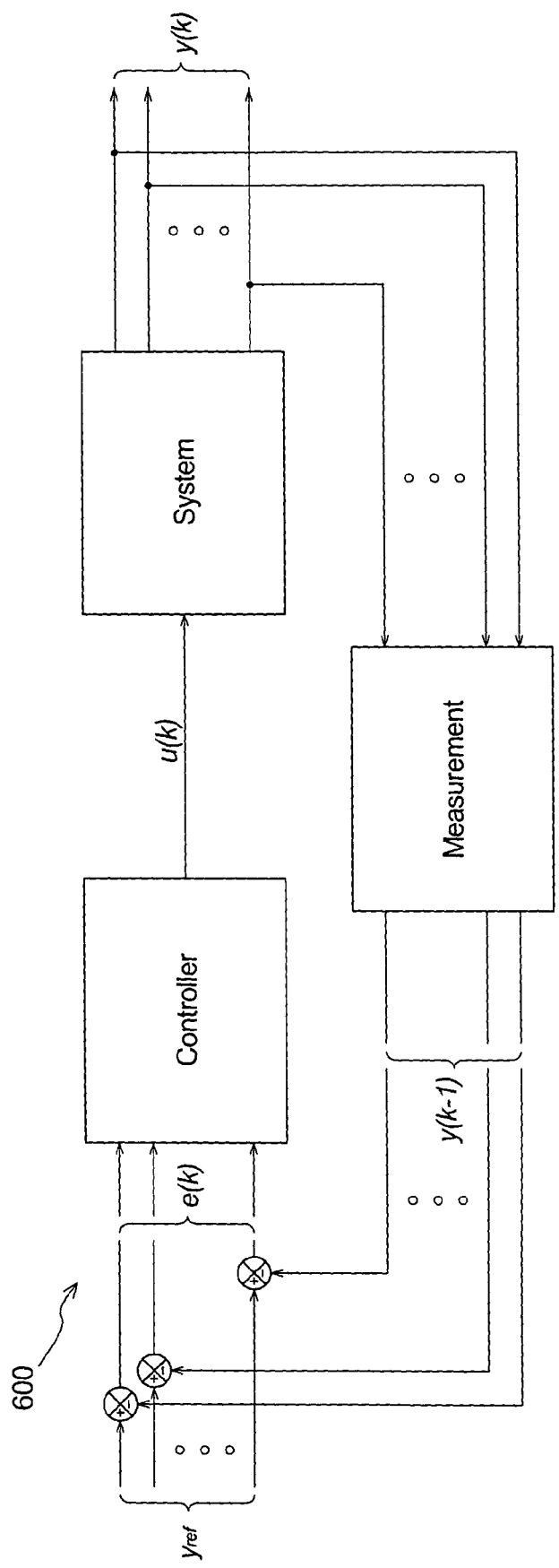
FIG. 6 illustrates and embodiment of a feedback loop employed by a method of controlling access to a computing resource of the present invention as a block diagram.

An embodiment of the feedback loop is illustrated as a block diagram in FIG. 6. The feedback look 600 comprises a controller block 602, a system block 604, and a measurement block 606. The controller block 602 provides an operating point u(k) which is the aggregate target throughput. The system block 604 allocates the aggregate target throughput to the workloads according to the specification of the bands which results in measured latencies y(k) for the workloads. The measured latencies are average latencies observed over a sampling period. The measurement block 606 forwards the previous cycle's measured latencies y(k−1) to the controller block 602. The target latencies $y_{ref}$ are also provided to the controller block 602. The controller block 602 applies the controller function to the lowest latency error value e(k), which is the lowest value of the target latencies $y_{ref}$ minus the respective values of the previous cycle's measured latencies y(k−1). Based on the lowest latency error value e(k), the controller block 602 determines the operating point u(k) which is the maximum aggregate throughput allowed for the system. In an embodiment, throttling modules for each of the workloads adjust the workloads' throughputs accordingly. Each throttling module intercept requests somewhere on the data path for its workload, buffers requests that exceed the allowed throughput, and releases buffered requests as the allowed throughput dictates. The throttling module for a workload may be located at the client or somewhere on the network between the client and the storage server.

The proposed method does not make any assumptions about the location of the controller or the throttling module. The throttling module may be anywhere on the data path from client to storage server. The controller does not have to be on the data path, but needs to communicate to the throttling module and should be highly available.

The feedback loop 600 employs a non-adaptive controller. A non-adaptive controller is applicable when the target system operates within a certain operating range. That is, the system configuration and state as well as the dynamics of the workloads vary only to the extent that the statistically developed system model is still a good approximation of the system. In the general case, a computing system operates in more than one operating range. Thus, the feedback loop 600 employs a plurality of controller functions, one for each operating range.

Determination of the controller function for each operating range employs a system identification and validation process. The system identification and validation process begins with developing a model of the target system. Here, the system is considered to be a black box. So, statistical methods are used to obtain the model. That is, the system is excited with white noise input signal which comprises signals that covering a spectrum of potential input frequencies (other input signals for exciting the system are possible, e.g., sinusoid signals). In an embodiment, this is implemented in the throttling modules. The clients send as many requests as they are allowed to by the throttling modules. To ensure that worst-case system dynamics are captured, the identification process uses the maximum number of clients (8 in exemplary system discussed here) and looks at the performance of two extreme workload conditions: (i) the entire data set fits in the storage servers' cache (DRAM memory); (ii) all requests go to random locations on the storage servers' disks. Most other models fall somewhere between these two extremes.

The response latency for every request sent to the system is measured on each client. The measured latencies are averaged over every sampling interval. In an embodiment, system identification involves fitting these measured average values to the following discrete-time linear model using least-squares regression. (At a high level, least squares regression is based on the assumption that large measurement changes are highly unlikely to be caused by noise and thus should be taken into account more than small changes.)

A model of the feedback loop 600 is given by:

$$y(k) = \sum_{i=1}^{N} \alpha_i y(k-i) + \sum_{i=0}^{N} \beta_i u(k-i) \qquad (7)$$

where y(k) is the average latency of the requests during sampling interval k, u(k) is the operating point calculated at the beginning of interval k, and the number N is the order of the system, which captures the extent of correlation between the system's current and past states.

An important aspect of system identification is to find the order of the model (N) which results in a good fit for the measured data. This is related to the sampling period used to obtain measurements of the system and the inertia or "memory" of the system. When the request latency is much smaller than the sampling period, a first-order model is usually sufficient to capture the dynamics of the system, because each sampling period contains a large number of requests, and requests occurring in period k−2 have little impact on the latency in period k. If, however, request latencies are comparable (or longer) than the sampling period, a higher order system model is required. Intuitively, a long sampling period may result in slow reaction and thus insufficient actuation by the controller. On the other hand, a short sampling period may result in considerable measurement noise and model overfitting, which in turn leads to oscillations in the controlled system.

Table 3 provides $R^2$ fit and correlation coefficients of the residual error for a first-order model as the sampling period is varied in the exemplary system studied here.

TABLE 3

| Model of | Sample interval (ms) | | | | | | | | | |
|---|---|---|---|---|---|---|---|---|---|---|
| | 1000 | | 750 | | 500 | | 300 | | 100 | |
| | $R^2$ | $C_{coef}$ | $R^2$ | $C_{coef}$ | $R^2$ | $C_{coef}$ | $R^2$ | $C_{coef}$ | $R^2$ | $C_{coef}$ |
| Cache | 0.764 | 0.04 | 0.745 | 0.05 | 0.685 | 0.04 | 0.479 | 0.140 | 0.439 | 0.140 |
| Disk | 0.416 | 0.045 | 0.399 | 0.05 | 0.379 | 0.03 | 0.159 | 0.047 | 0.112 | 0.026 |

The $R^2$ fit and the correlation coefficient of the residual error are model-fitting metrics. The correlation coefficient of the residual error is a number between 0 and 1 (the lower the better), which shows how much predictable information from the measured data is not captured by the model. A value close to zero means that there is no more predictable information in the data for us to extract. The $R^2$ fit is also a number between 0 and 1 (the higher the better) that indicates how much variation in the measured data is represented by the model. In the table, $R^2$ values are worse for the on-disk model, because measured latencies are more unpredictable in that case.

Table 3 shows that a first-order model extracts most of the information from the data. The two exceptions are the 300 and 100 ms intervals for the in-cache case. Higher-order models were tried for these cases, but they resulted in less than 0.05 improvement to $R^2$ fits—and were still a lot worse than having a sample period $\geq$500 ms. Thus, first-order models (N=1) are used for the rest of the discussion. The sampling intervals of 500 ms or higher provided the best fits. As 500 ms is close to the sample period where the model degrades, a sample period of 1 s is used for further discussion here. Note that the choice of a first order model and a sampling period of 1 s here is an example of a method of choosing the order of the system model and the sampling period.

Figure 9A:
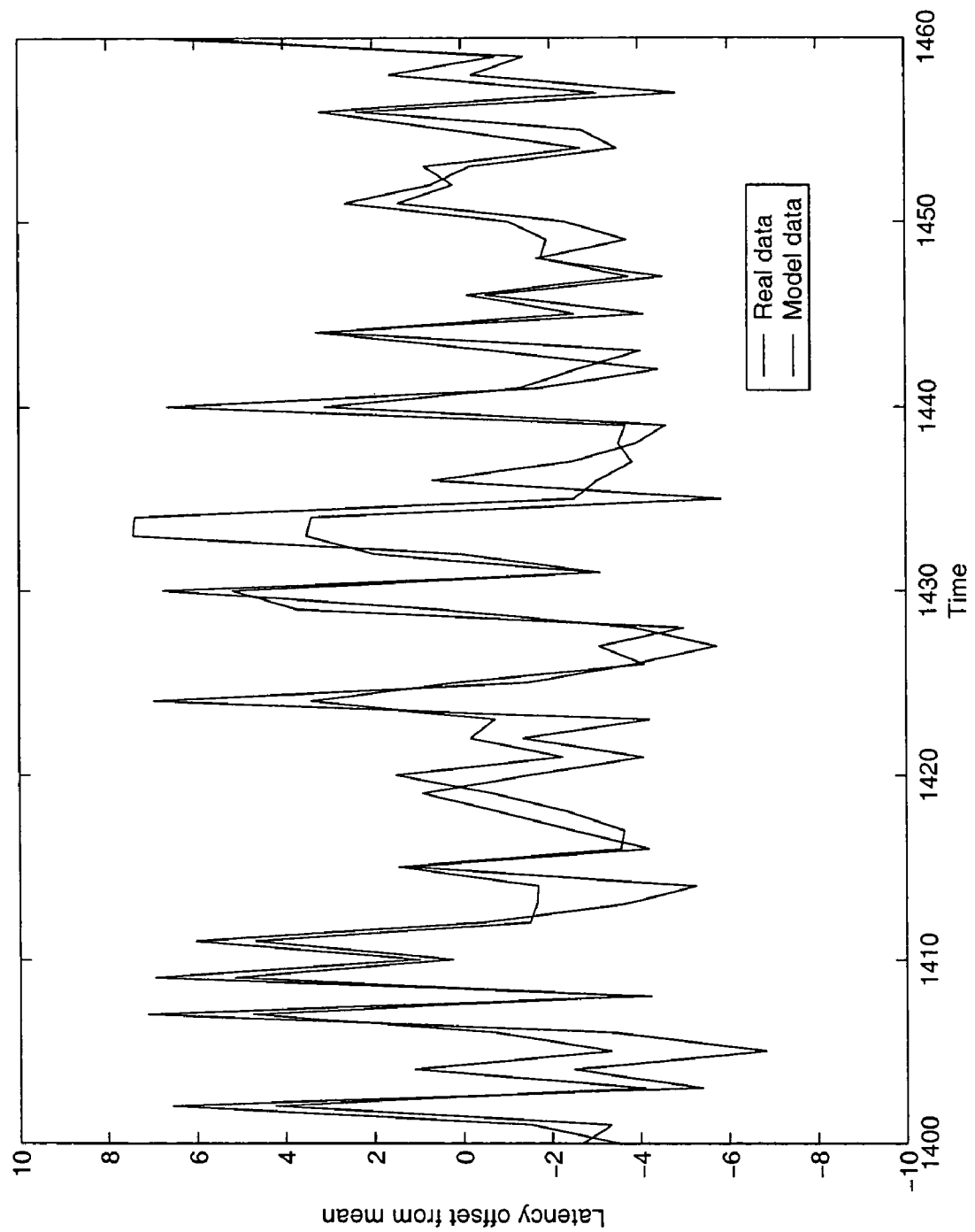
FIGS. 9A and 9B are graphs showing test results for an exemplary embodiment.
Figure 9B:
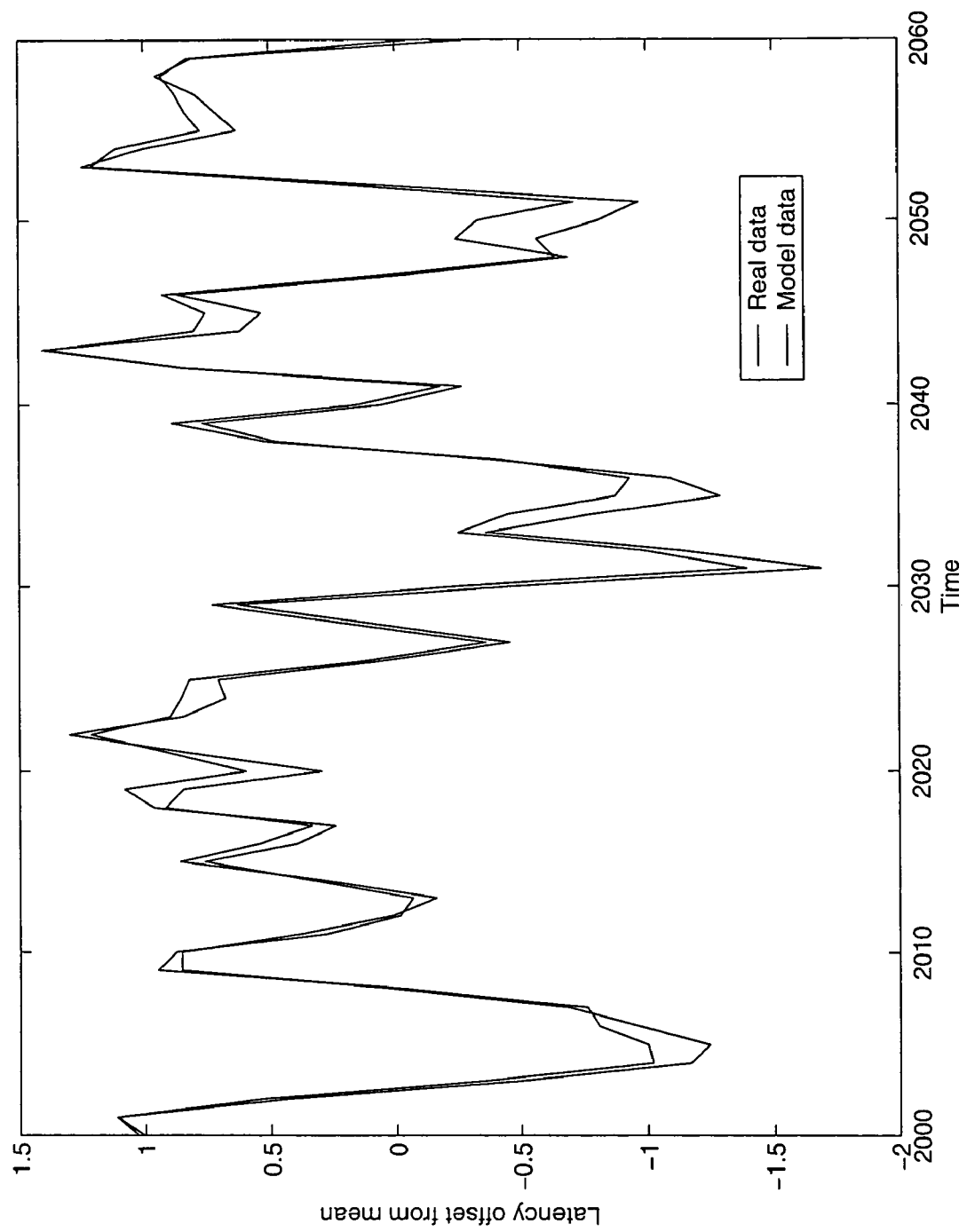

Note, that traditionally $R^2 \geq 0.8$ is considered to be a good fit for a system that can be approximated by a linear equation. Since this is not the case in the exemplary system, a plot of model data versus real data was used to judge whether the model is good. FIGS. 9A and 9B show that both models predict the trends correctly, but miss the correct magnitude of the value in extreme cases, a situation that R2 is biased against. FIG. 9A depicts the situation when all accesses were to the cache. The model estimated for this data is given by:

$y(k)=0.003827u(k)+0.04554y(k-1)$

FIG. 9B depicts the situation when all accesses were to disk. The model estimated for this data is given by:

$y(k)=0.1377u(k)+0.001109y(k-1)$

The two models are substantially different, which results in different controller designs for each case. Also, in both models, the latency during interval k, y(k), depends heavily on the actuation of the system, u(k), during the same interval. The latter is the operating point decided by the controller at the beginning of interval k. y(k) depends much less on the latency of interval k−1. (This is so, because the value of y(k) is typically in the range of 0.1, while u(k) is in the range of 100.) The intuition behind this is that the sample period is orders of magnitude larger than the request latencies.

Having completed system identification, the next step is to design and assess (i.e., validate) a controller for the feedback loop 600 (FIG. 6). It is known that for a first-order system like the one here, a simple integral (I) controller suffices to control the system. The following is the time-domain difference equation for an I-controller:

$$u(k)=u(k-1)+K_1 e(k) \tag{8}$$

In the system here, $e(k)=y_{ref}-w(k)$, where w(k) is the average measured latency in the system during interval k−1, i.e., w(k)=y(k−1). The controller output, u(k), is the desirable operating point of the system during interval k. $K_1$ is a constant controller parameter that captures how reactive the controller is to the observed error. An integral controller ensures that the measured error in the system output goes to zero in steady state if the reference signal is a step function. For the system here, this means that the system latency will be able to track the latency reference in steady state. Intuitively, when the latency error is positive (i.e., the measured latency is lower than the reference), u(k) is larger than u(k−1) to allow more requests to go through to fully utilize the system. On the other hand, a negative latency error indicates an overload condition in the system, and the controller decreases u(k) to throttle back the requests to meet the latency goals.

However, to choose a value for $K_1$ that leads to a stable system with low settling times and low overshoot, the closed-loop transfer function should be analyzed using its Z-transform. The Z-transform of the controller, K(z), can be derived from equation (8) as follows:

$$U(z) = U(z)z^{-1} + K_1 E(z) \Rightarrow K(z) = \frac{U(z)}{E(z)} = \frac{zK_1}{z-1} \tag{9}$$

The transfer function of the closed-loop system, T(z), can be derived from the Z-transforms of its components using standard algebraic manipulations of Z-transforms as follows:

$$T(z) = \frac{Y(z)}{Y_{ref}(z)} = \frac{K(z)G(z)}{1+K(z)G(z)H(z)} = \frac{N(z)}{D(z)} \tag{10}$$

In this equation, K(z) is given by (9) and $$G(z) = Gc(z) = \frac{0.003827z}{z-0.04554} \text{ or } G(z) = G_d(z) = \frac{0.1377z}{z-0.00109}$$

respectively, for each of the two system models derived above. $H(z)=z^{-1}$ representing a delay of one interval for the measured average latency to affect the system. Inserting these values into (10), two versions of the system's transfer function are obtained, one for each of the system models. Both transfer functions have a denominator D(z), which is a third-order polynomial. However, one of the poles is always at zero. Thus, only the location of two poles can be controlled. Control theory states that if the poles of T(z) are within the unit circle (|z|<1 for all z such that D(z)=0), the system is stable. Solving this, it is found that the system is stable with $0<K_{1c}\leq 546$ for the on-cache workload, and with $0<K_{1d}\leq 14.5$ for the on-disk workload. It is important that the system is stable irrespective of whether the data is retrieved from the cache or from the disk, as this depends not only on the access pattern of the workload but also on other workloads' activities in the system. For example, one workload might have its data completely in the cache if it is running alone in the system, but it might have all its data being retrieved from the disk if there are other concurrent workloads evicting its data from the cache. This means that only for values $0<K_1\leq 14.5$ is the closed loop system stable in practice.

Figure 10A:
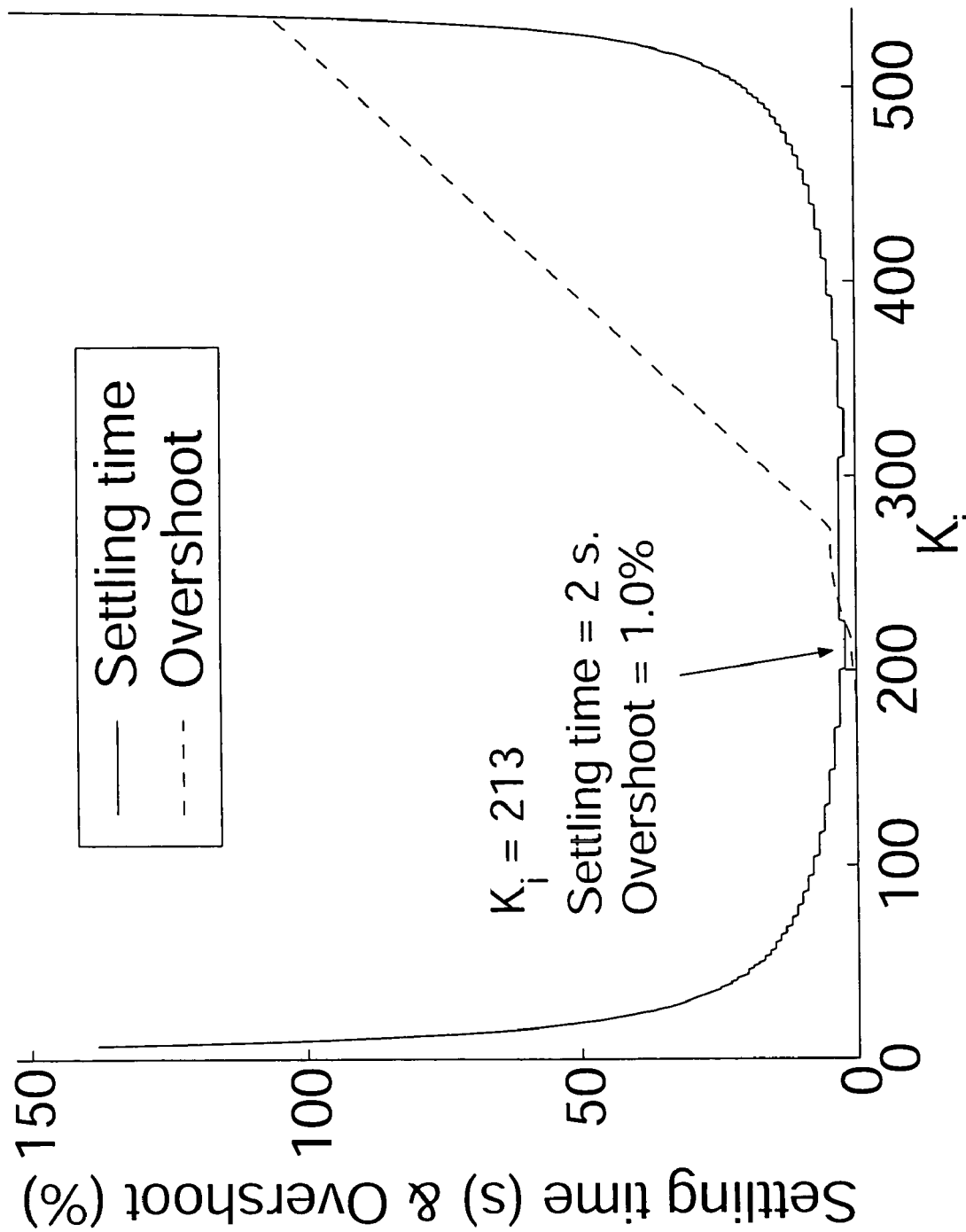
FIGS. 10A and 10B are graphs showing test results for an exemplary embodiment.
Figure 10B:
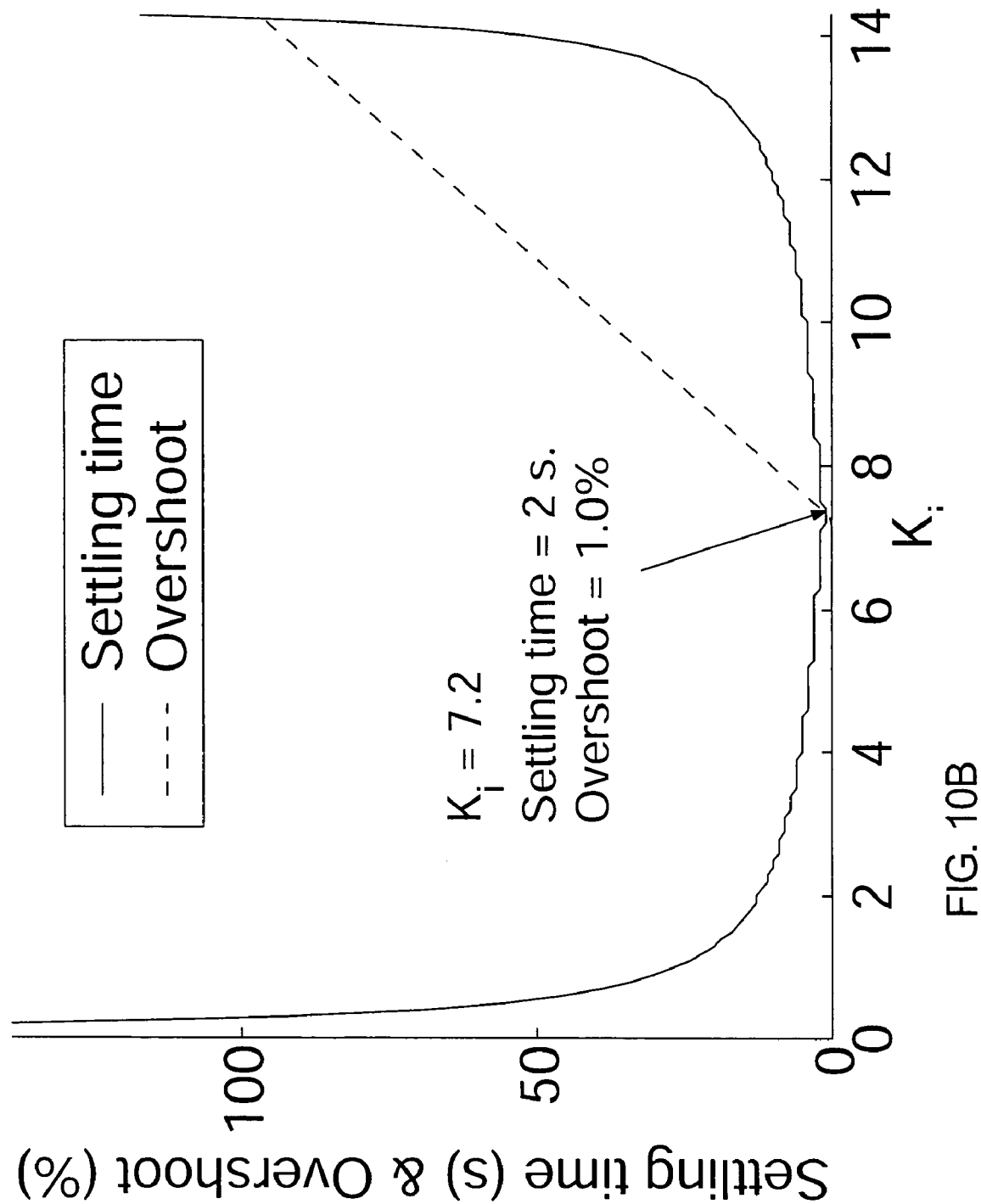
Figure 11A:
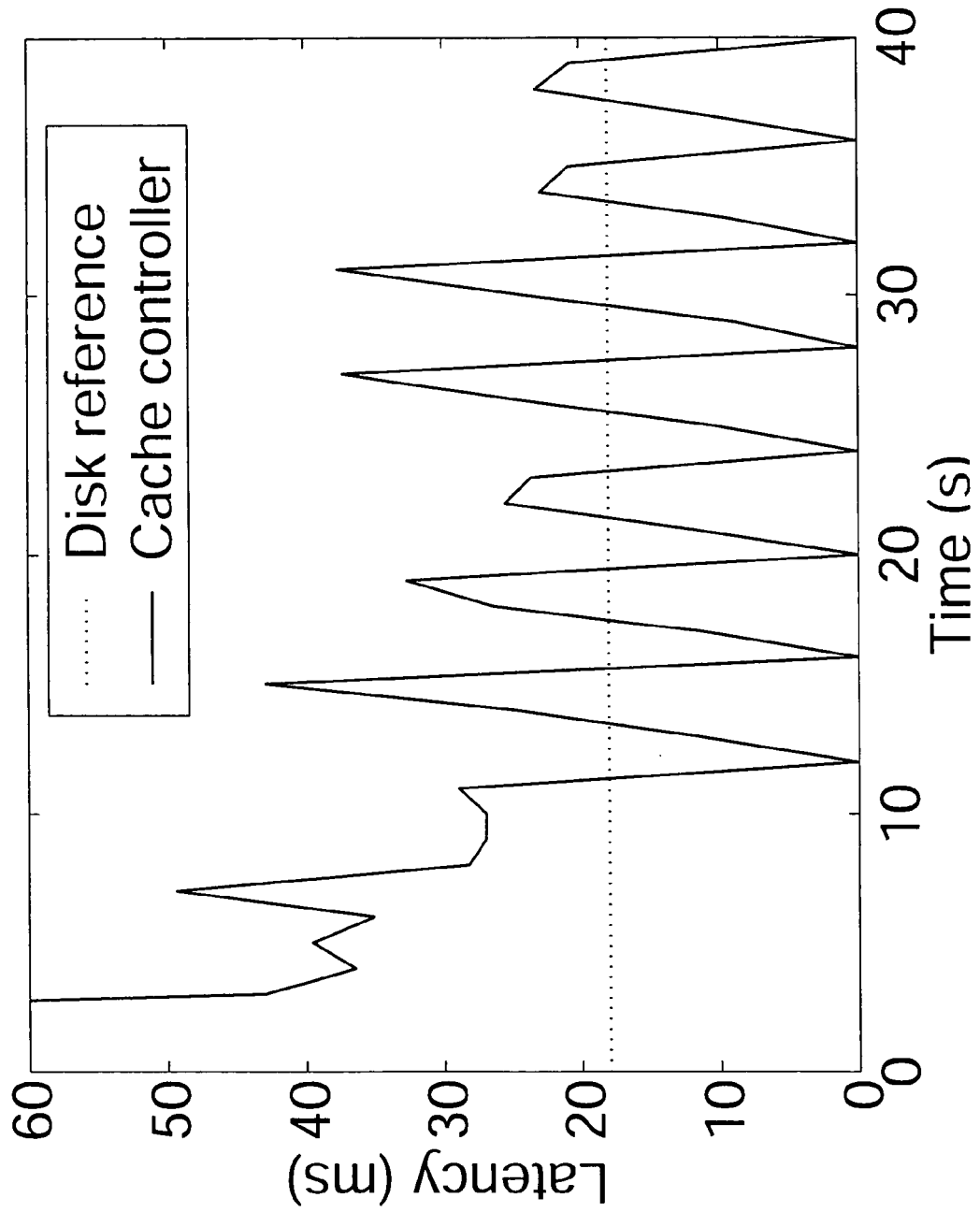
FIGS. 11A and 11B are graphs showing test results for an exemplary embodiment.
Figure 11B:
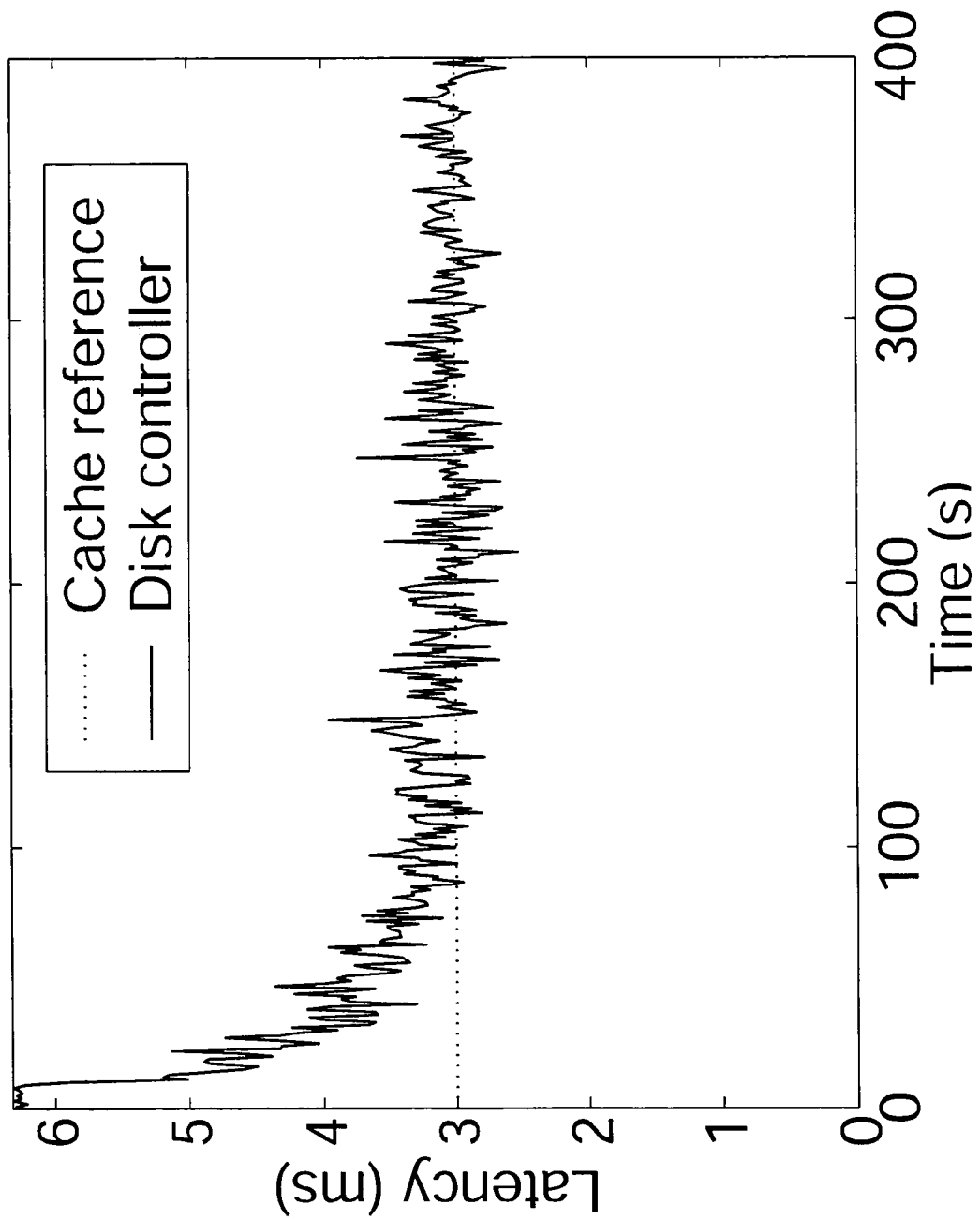

However, stability alone is not enough. A value for $K_1$ should be chosen which also results in low settling times and low overshoot for the range of possible system models. To do this, the transfer functions are used to calculate the output values of the system under a step excitation, for different values of $K_1$. As FIGS. 10A and 10B show, $K_{1c}=213$ and $K_{1d}=7.2$ are good values for the in-cache and on-disk models, respectively. However, there is no single $K_1$ value that works for both cases. Indeed, as FIG. 11B shows, when a controller designed for the in-cache model (with $K_{1c}=213$) is applied to a system with most accesses on disk, it results to an unstable closed loop system. Conversely, when a controller designed for the disk model (with $K_{1d}=7.2$) is applied to a workload that mostly retrieves data from the cache, FIG. 11A shows that unacceptably long settling times and oscillations result (right side of FIG. 11A).

The arguments made above for a non-adaptive I-controller apply to any non-adaptive controller (P, PID, MIMO, etc). If a controller other than an I-controller is chosen, different parameters need to be identified for the appropriate operating range(s) of the system.

In conclusion, a plurality of non-adaptive controllers is applicable to storage systems that operate within an expected operating range (i.e., there are no major changes in the system such as storage server additions or removals, radical software upgrades, etc). If the operating range of the system changes to the extent that the plurality of non-adaptive controllers is insufficient and results in instabilities, oscillations or long settling times, the system identification and validation process described above can be repeated to determine another plurality of controller functions for the changed system.

The plurality of non-adaptive controllers models the expected operating range of the system. That is, an off-line system identification and validation process is performed over the expected operating range (e.g., using different ratios of in-cache and on-disk hits, in the example above) using appropriate excitation. Having pre-computed the plurality of system models, a controller is designed and instantiated for each of them. Each operating range is characterized by the maximum throughput for certain (achievable) latency goals, for each workload. Based on the pair of values <max throughput, latency> measured on-line in the system, the appropriate controller is chosen for controlling access to the system.

Figure 7:
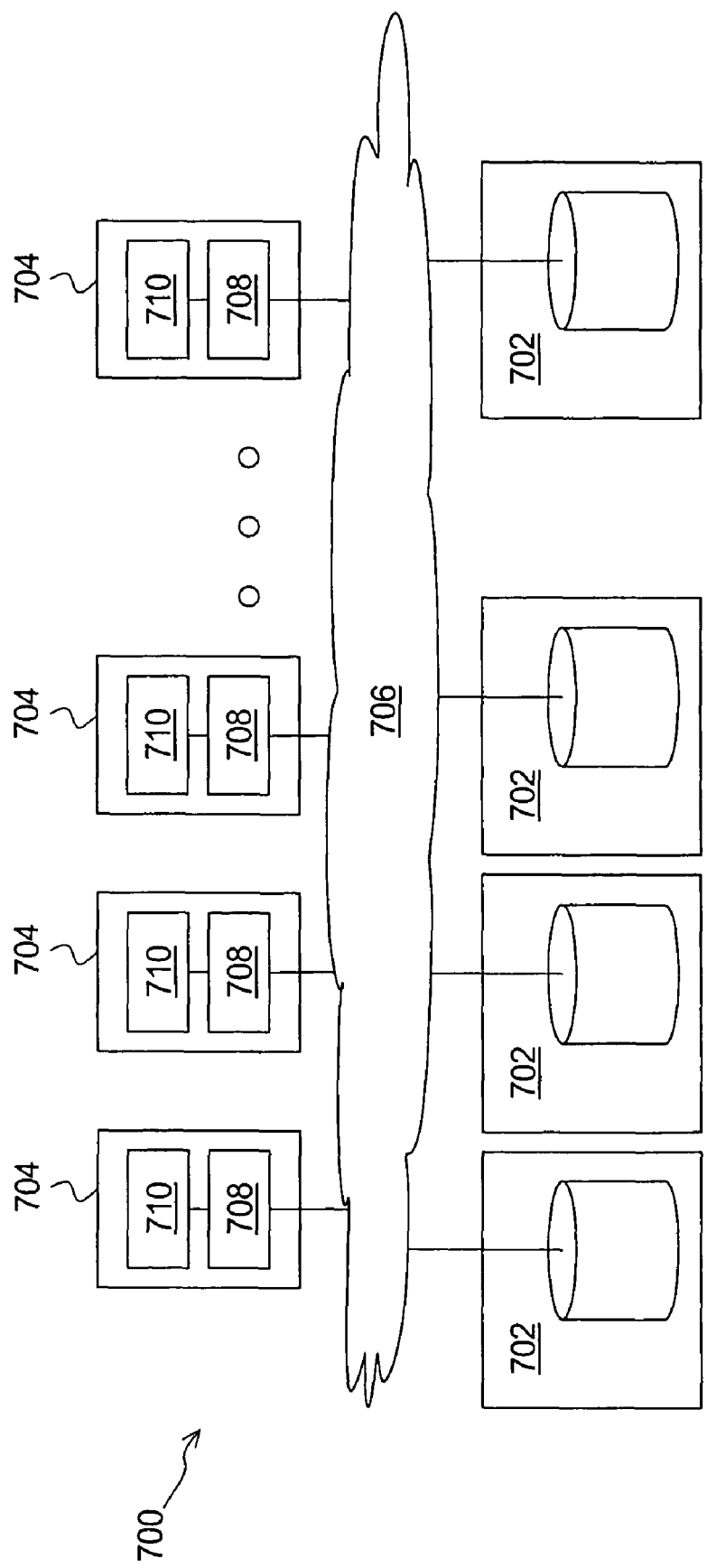
FIG. 7 schematically illustrates an embodiment of a shared computing environment upon which a method of distributively controlling access to storage resources of the present invention is applied.

FIG. 7 schematically illustrates an embodiment of a shared computing environment upon which the method of distributively controlling access to storage is applied. The shared computing environment comprises storage servers 702 coupled to clients 704 by a network 706. In operation, clients 704 perform I/O operation on the storage servers 702.

Figure 8:
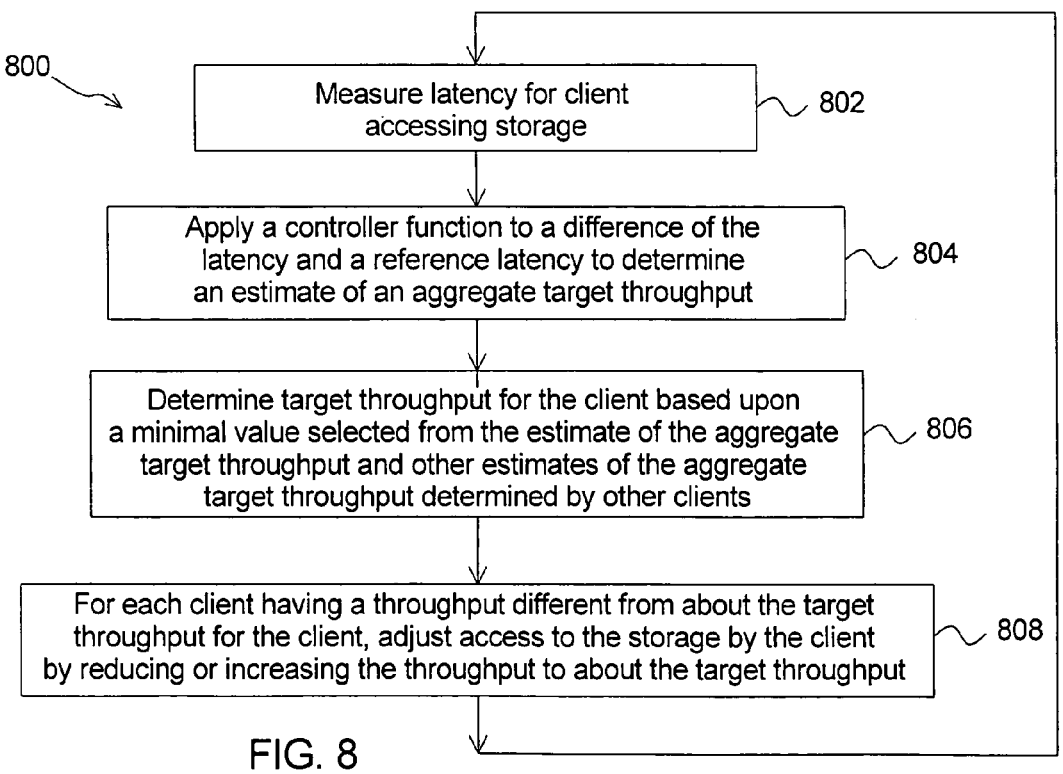
FIG. 8 illustrates an embodiment of a method of distributively controlling access to storage of the present invention as a flow chart.

An embodiment of a method of controlling access to storage system of the present invention is illustrated as a flow chart in FIG. 8. The method 800 comprises iteratively performing first through fourth steps, 802 through 808. Preferably, each of the clients 704 (FIG. 7) performs the method so that access to the storage system 800 is controlled with an expectation of optimality. Alternatively, some of the clients 704 do not perform the method 700 leading to a possibility of sub-optimal control of access to the storage system 800.

The method 800 begins with the first step 802 of measuring a latency for a client 704A accessing one or more of the storage servers 702. The method 800 continues with the second step 804 (FIG. 8) of applying a controller function to a difference of the latency and a reference access latency to determine an estimate of aggregate target throughput for the storage system 700.

Preferably, the controller function is provided by an adaptive controller such as discussed above relative to the feedback loop 300 (FIG. 3). Alternatively, the controller function is provided by another controller such as the non-adaptive controller employing a plurality of controller functions for various operating ranges as discussed above relative to the feedback loop 600 (FIG. 6).

In the third step 806, the method 800 determines a target throughput for the client 704A. The target throughput is based upon a minimal value selected from the estimate of the aggregate target throughput and other estimates of the aggregate target throughput determined by others of the clients 704 of the storage system 700.

An iteration of the method 800 concludes with the fourth step 808 of adjusting access to the storage system 700 for the client 704A by increasing or decreasing a throughput limit to about the target throughput if the client 704A has a throughput limit different from about the target throughput.

In an alternative embodiment, the method 800 controls access to a computing resource other than storage (e.g., network bandwidth) by iteratively performing first through fourth steps. In the alternative embodiment, the first step measures a performance parameter for a node of a shared computing environment. In the second step, the alternative method applies a controller function to a difference of the performance parameter and a reference performance parameter to determine an estimate of a system operating point. In the third step, the alternative method determines an operating point for the node based upon an optimal value selected from the estimate of the system operating point and other estimates of the system operating points determined by other nodes of the shared computing environment. An iteration of the alternative method concludes with a fourth step of adjusting an access limit for the node to the operating point if the access limit for the node is different from the operating point. One way to ensure predictable performance of computing systems is by arbitrating the use of existing resources under transient high-load conditions. The method 800 (FIG. 8) employs a feedback loop on each client 704 (FIG. 7) that arbitrates the rate that multiple concurrent workloads send requests to the storage servers 702.

Ideally, it is desirable that: 1) the controller reacts to end-to-end latencies as perceived by the application, since these capture overall system capacity, including for example storage area network bandwidth; and 2) the controller is highly available even in an overloaded system (which is exactly what the feedback loop is designed to address).

The method 800 is applicable to any computing system with multiple ingress points, one for each different workload applied to the system.

Preferably, the method 800 employs a throttling module and a controller module at each client 704. The throttling module performs the actual workload throttling at the ingress point. The throttling module is physically located at the ingress point (e.g., client access protocol module, intelligent network switch, load balancer, etc). The controller module, given the currently observed end-to-end latency for a particular workload and some (global) specifications for throughput allotments and latency reference points, decides how much to throttle that specific workload.

The throttling module needs to be physically located at the ingress point to efficiently throttle the corresponding workload. There is no such requirement for the controller. However, the controller has to be highly available and provide input to the throttling module under any conditions, including overload conditions (when it is exactly when throttling is mostly needed). Thus, it is preferable to locate the controller module together with the throttling module at the ingress point.

In an embodiment, each client 704 includes a throttling module 708 and a controller module 710 (FIG. 7). The reference input to the controller module 710 for a particular client 704 is the latency goal for the particular client's workload and the error is estimated locally. The controller module 710 calculates locally the operating point of the system, from its own perspective. Preferably, the corresponding share for the local workload is derived from a throughput allocation table which specifies shares on the basis of throughput bands. Each controller module 710 each has a copy of the throughput allocation table. Since the throughput allocation table changes infrequently, having a copy of it at each of the clients 704 does not create a strict synchronization requirement among the clients 704. Alternatively, the corresponding share for the workload is allocated on a percentage basis among the clients 704.

The controller modules 710 have to agree on the lowest operating point, as this is used across all clients 704. (If the minimal value was not used, some clients might send too many requests and violate isolation.) This requires some simple agreement protocol among the clients 704 that is executed once every sampling period.

For example, a client 704A (e.g., the one with the smallest id) calculates the operating point locally and sends it to all other clients; other clients respond to the group only if they have calculated a lower value. The throttling module 708 for each client 704 imposes a maximum request rate for outgoing requests from the client (i.e., a throughput limit).

In an alternative embodiment of the method 800 (FIG. 8), the controller modules 710 (FIG. 7) perform independent dynamic provisioning for multiple workloads so long as the total provisioning satisfies certain constraints.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of controlling access to a computing resource within a shared computing environment comprising:
   determining, by a computer, a plurality of controller functions for a plurality of operating ranges for workloads accessing the computing resource, each of the controller functions comprising a mathematical operator which takes an input and provides an output;
   iteratively performing by the computer:
      measuring performance parameters for the workloads to determine a performance parameter vector for the workloads;
      comparing the performance parameter vector to a reference performance parameter vector to determine an error parameter;
      applying a particular controller function selected from the plurality of controller functions to the error parameter to determine a target throughput for each of the workloads; and
      for each workload having a throughput limit different from the target throughput for the workload, adjusting access to the computing resource by the workload by reducing or increasing the throughput limit for the workload based on the target throughput.

2. The method of claim 1 wherein determining the plurality of controller functions comprises performing a regression analysis on white noise input and resulting latencies.

3. The method of claim 1 wherein the workloads comprise desired input/output operations for storage.

4. The method of claim 1 wherein the controller functions comprise a plurality of linear controller functions.

5. The method of claim 1 wherein the performance parameters comprise latencies.

6. The method of claim 1 wherein applying the particular controller function to the error parameter comprises applying the particular controller function that also takes into account a prior target throughput.

7. The method of claim 1 wherein adjusting the access to the computing resource comprises adjusting a throttling module to reduce or increase the throughput.

8. The method of claim 1 wherein the error parameter is determined by subtracting the performance parameter vector from the reference performance parameter vector which forms an error vector and selecting a minimum term from the error vector as the error parameter.

9. The method of claim 1 wherein applying the particular controller function to the error parameter further comprises applying the controller function to a current aggregate target throughput.

10. The method of claim 1 wherein adjusting the access to the computing resource for the workload employs a throughput allocation table which specifies shares for the workloads according to throughput bands.

11. The method of claim 1 wherein the computing resource is selected from a group consisting of storage, processor cycles, processing units, network bandwidth, memory, servers, another computing resource, and a combination thereof.

12. The method of claim 1, wherein reducing or increasing the throughput limit based on the target throughput comprises reducing or increasing the throughput limit to about the target throughput.

13. A method of controlling access to a storage system comprising the steps of:
determining, by a computer, a plurality of controller functions for a plurality of operating ranges for workloads accessing the storage system, each of the controller functions comprising a mathematical operator which takes an input and provides an output;
iteratively performing by the computer:
measuring latencies for the workloads to determine a latency vector for the clients;
comparing the latency vector to a reference latency vector to determine an error parameter
applying a particular controller function selected from the plurality of controller functions to the error parameter to determine a target throughput for each of the workloads; and
for each workload having a throughput limit different from the target throughput for the workload, adjusting access to the storage system by the workload by reducing or increasing the target throughput for the workload based on the target throughput.

14. The method of claim 1 wherein the error parameter is determined by subtracting the latency vector from the reference latency vector which forms an error vector and selecting a minimum term from the error vector as the error parameter.

15. The method of claim 1 wherein applying the controller function to the error parameter further comprises applying the controller function to a current aggregate target throughput.

16. The method of claim 1 wherein adjusting the access to the storage system for the workload employs a throughput allocation table which specifies shares for the workloads according to throughput bands.

17. The method of claim 13, wherein reducing or increasing the throughput limit based on the target throughput comprises reducing or increasing the throughput limit to about the target throughput.

18. A computer readable media comprising computer code for implementing a method of controlling access to a computing resource within a shared computing environment, the method of controlling access to the computing resource comprising the steps of:
determining a plurality of controller functions for a plurality of operating ranges for workloads accessing the computing resource, each of the controller functions comprising a mathematical operator which takes an input and provides an output;
iteratively performing the steps of:
measuring performance parameters for the workloads to determine a performance parameter vector for the workloads;
comparing the performance parameter vector to a reference performance parameter vector to determine an error parameter;
applying a particular controller function selected from the plurality of controller functions to the error parameter to determine a target throughput for each of the workloads; and
for each workload having a throughput limit different from about the target throughput for the workload, adjusting access to the computing resource by the workload by reducing or increasing the throughput limit for the workload to about the target throughput.

19. A computer readable media comprising computer code for implementing a method of controlling access to a computing resource within a shared computing environment, the method of controlling access to the computing resource comprising the steps of:
determining a plurality of controller functions for a plurality of operating ranges for workloads accessing the storage system, each of the controller functions comprising a mathematical operator which takes an input and provides an output;
iteratively performing the steps of:
measuring latencies for the workloads to determine a latency vector for the clients;
comparing the latency vector to a reference latency vector to determine an error parameter
applying a particular controller function selected from the plurality of controller functions to the error parameter to determine a target throughput for each of the workloads; and
for each workload having a throughput limit different from the target throughput for the workload, adjusting access to the storage system by the workload by reducing or increasing the target throughput for the workload based on the target throughput.

20. The computer readable media of claim 19, wherein reducing or increasing the throughput limit based on the target throughput comprises reducing or increasing the throughput limit to about the target throughput.

* * * * *

UNITED STATES PATENT AND TRADEMARK OFFICE
CERTIFICATE OF CORRECTION

| | |
|---|---|
| PATENT NO. | : 7,827,361 B1 |
| APPLICATION NO. | : 10/970888 |
| DATED | : November 2, 2010 |
| INVENTOR(S) | : Magnus Karlsson et al. |

It is certified that error appears in the above-identified patent and that said Letters Patent is hereby corrected as shown below:

In column 19, line 64, in Claim 14, delete "claim 1" and insert -- claim 13 --, therefor.

In column 20, line 1, in Claim 15, delete "claim 1" and insert -- claim 13 --, therefor.

In column 20, line 4, in Claim 16, delete "claim 1" and insert -- claim 13 --, therefor.

Signed and Sealed this
Twenty-second Day of March, 2011

David J. Kappos
*Director of the United States Patent and Trademark Office*